(12) United States Patent
Vergoullis et al.

(10) Patent No.: US 12,343,236 B2
(45) Date of Patent: Jul. 1, 2025

(54) SCAN POSTS SYSTEM AND METHOD

(71) Applicant: VP INNOVATO HOLDINGS LTD., Oroklini (CY)

(72) Inventors: Ioannis Vergoullis, Rhodes (GR); Georgios Papadopoulos, Rhodes (GR)

(73) Assignee: VP INNOVATO HOLDINGS LTD., Oroklini (CY)

( * ) Notice: Subject to any disclaimer, the term of this patent is extended or adjusted under 35 U.S.C. 154(b) by 386 days.

(21) Appl. No.: 18/000,287

(22) PCT Filed: Apr. 1, 2021

(86) PCT No.: PCT/IB2021/052724
§ 371 (c)(1),
(2) Date: Nov. 29, 2022

(87) PCT Pub. No.: WO2021/245469
PCT Pub. Date: Dec. 9, 2021

(65) Prior Publication Data
US 2023/0248483 A1 Aug. 10, 2023

(30) Foreign Application Priority Data

Jun. 4, 2020 (GR) .............................. 20200100312

(51) Int. Cl.
*A61C 8/00* (2006.01)
*A61C 9/00* (2006.01)

(52) U.S. Cl.
CPC .......... *A61C 8/0089* (2013.01); *A61C 9/0053* (2013.01)

(58) Field of Classification Search
CPC ..... A61C 8/0089; A61C 9/0053; A61C 9/004; A61C 9/00

(Continued)

(56) References Cited

U.S. PATENT DOCUMENTS

| 512,840 A | 1/1894 | Phelps |
| 5,180,303 A | 1/1993 | Hornburg et al. |

(Continued)

FOREIGN PATENT DOCUMENTS

| EP | 2343025 A2 | 7/2011 |
| EP | 2462893 A1 | 6/2012 |

(Continued)

OTHER PUBLICATIONS

Leger et al., Healing element for dental restoration, machine translation (Year: 2016).*

(Continued)

*Primary Examiner* — Eric J Rosen
*Assistant Examiner* — Mirayda A Aponte
(74) *Attorney, Agent, or Firm* — Steinfl + Bruno LLP

(57) ABSTRACT

A scan posts system with scan posts is presented. Each scan post includes a scan post core and a scan post body surrounding the core and resting in the shoulder of the core. At least part of the scan post body is intended to be in contact with healing tissue. Each scan post body belongs to a group of scan post bodies including at least a combination of two different shapes with three different sizes and at least one height. Each scan post body includes at least one scan mark suitable for providing information about the shape, size and height of the scan post to a scanning device, this information being useful for designing a dental implant prosthesis. A method of manufacturing a dental implant prosthesis using such a system is also presented.

23 Claims, 11 Drawing Sheets

(58) Field of Classification Search
USPC ........................................................ 433/173
See application file for complete search history.

(56) References Cited

U.S. PATENT DOCUMENTS

| | | | |
|---|---|---|---|
| 5,183,053 A | 2/1993 | Yeh et al. |
| 5,338,196 A | 8/1994 | Beaty et al. |
| 5,492,471 A | 2/1996 | Singer |
| 5,499,918 A | 3/1996 | Morgan et al. |
| 5,759,036 A | 6/1998 | Hinds |
| 5,810,592 A | 9/1998 | Daftary |
| 5,846,079 A | 12/1998 | Knode |
| 5,984,682 A | 11/1999 | Carlson |
| 6,095,817 A | 8/2000 | Wagner et al. |
| 6,386,876 B1 | 5/2002 | Lee |
| 6,672,871 B2 | 1/2004 | Hurson |
| 7,922,488 B2 | 4/2011 | Falk et al. |
| 8,007,279 B2 | 8/2011 | Bassett et al. |
| 8,033,826 B2 | 10/2011 | Towse et al. |
| 8,628,327 B1 | 1/2014 | Blaisdell et al. |
| 9,572,640 B2 | 2/2017 | Blaisdell et al. |
| 9,895,209 B2 | 2/2018 | Blaisdell et al. |
| 10,136,974 B2 | 11/2018 | Vergoullis et al. |
| 10,420,632 B2 | 9/2019 | Vergoullis et al. |
| 11,116,613 B2 | 9/2021 | Vergoullis et al. |
| 11,446,122 B2 | 9/2022 | Vergoullis et al. |
| 2002/0106610 A1 | 8/2002 | Hurson |
| 2003/0211445 A1 | 11/2003 | Klardie et al. |
| 2006/0019219 A1 | 1/2006 | Saliger et al. |
| 2006/0228672 A1 | 10/2006 | Hurson |
| 2008/0176186 A1 | 7/2008 | Schaub |
| 2010/0105009 A1 | 4/2010 | Karkar et al. |
| 2010/0196849 A1 | 8/2010 | Moneim et al. |
| 2011/0020768 A1 | 1/2011 | Spagnoli et al. |
| 2011/0129798 A1 | 6/2011 | Zucker et al. |
| 2011/0200968 A1 | 8/2011 | Laizure, Jr. |
| 2012/0264081 A1 | 10/2012 | Philibin |
| 2012/0295223 A1 | 11/2012 | Robb et al. |
| 2013/0084541 A1 | 4/2013 | Von Malottki |
| 2013/0177872 A1 | 7/2013 | Blaisdell et al. |
| 2013/0189646 A1 | 7/2013 | Hochman et al. |
| 2013/0196290 A1 | 8/2013 | Herrington et al. |
| 2013/0203015 A1 | 8/2013 | Falco |
| 2014/0080095 A1 | 3/2014 | Suttin et al. |
| 2014/0100327 A1 | 4/2014 | Yamaguchi et al. |
| 2014/0100642 A1 | 4/2014 | Mashiach |
| 2014/0124969 A1 | 5/2014 | Blaisdell et al. |
| 2014/0178835 A1 | 6/2014 | Lin |
| 2014/0193775 A1 | 7/2014 | Hogan et al. |
| 2014/0205969 A1 | 7/2014 | Marlin |
| 2014/0319713 A1 | 10/2014 | Blaisdell et al. |
| 2015/0100090 A1 | 4/2015 | Burke |
| 2015/0157424 A1 | 6/2015 | Zadeh |
| 2015/0173862 A1 | 6/2015 | Suttin et al. |
| 2015/0351875 A1 | 12/2015 | Mielecke |
| 2015/0351877 A1 | 12/2015 | Boehm et al. |
| 2015/0366641 A1 | 12/2015 | Malinin et al. |
| 2017/0007372 A1 | 1/2017 | Blaisdell et al. |
| 2017/0128176 A1 | 5/2017 | Vergoullis et al. |
| 2017/0172714 A1 | 6/2017 | Blaisdell et al. |
| 2018/0028283 A1 | 2/2018 | Lin et al. |
| 2018/0042736 A1 | 2/2018 | Wahl |
| 2018/0161134 A1 | 6/2018 | Liston et al. |
| 2018/0214253 A1 | 8/2018 | Guerra |
| 2018/0325630 A1 | 11/2018 | Leger et al. |
| 2019/0029786 A1 | 1/2019 | Vergoullis et al. |
| 2019/0201167 A1 | 7/2019 | Vergoullis et al. |
| 2019/0247149 A1 | 8/2019 | Simmonds |
| 2019/0282343 A1 | 9/2019 | Pfeiffer et al. |
| 2019/0357998 A1 | 11/2019 | Vergoullis et al. |
| 2020/0222155 A1 | 7/2020 | Vergoullis et al. |
| 2020/0237483 A1 | 7/2020 | Vergoullis et al. |
| 2021/0236244 A1 | 8/2021 | Vergoullis et al. |

FOREIGN PATENT DOCUMENTS

| | | |
|---|---|---|
| FR | 3027792 A1 | 5/2016 |
| FR | 3031667 A1 | 7/2016 |
| GB | 2502328 A | 11/2013 |
| GR | 20140100642 A | 7/2016 |
| GR | 20150100111 A | 10/2016 |
| JP | H08196549 A | 8/1996 |
| JP | 2010246762 A | 11/2010 |
| KR | 20100048968 A | 5/2010 |
| KR | 101419519 B1 | 8/2014 |
| KR | 101446064 B1 | 10/2014 |
| KR | 101495480 B1 | 3/2015 |
| KR | 20160006385 A | 1/2016 |
| KR | 101734706 B1 | 5/2017 |
| MX | 2010004033 A | 10/2011 |
| WO | 95/03007 A1 | 2/1995 |
| WO | 2013/041382 A1 | 3/2013 |
| WO | 2014/111413 A1 | 7/2014 |
| WO | 2015/189647 A1 | 12/2015 |
| WO | 2015/189648 A1 | 12/2015 |
| WO | 2017/029670 A1 | 2/2017 |
| WO | 2017/072066 A1 | 5/2017 |
| WO | 2017/221097 A1 | 12/2017 |
| WO | 2018/015562 A1 | 1/2018 |
| WO | 2018/065984 A1 | 4/2018 |
| WO | 2018/107121 A2 | 6/2018 |
| WO | 2019/038610 A1 | 2/2019 |
| WO | 2020/044302 A1 | 3/2020 |

OTHER PUBLICATIONS

Non-Final Office Action for U.S. Appl. No. 17/271,145, filed Feb. 24, 2021 on behalf of VP Innovato Holdings Ltd, et al., Mail Date: Oct. 13, 2023, 25 pages.

Restriction Requirement for U.S. Appl. No. 17/271,145, filed Feb. 24, 2021 on behalf of VP Innovato Holdings Ltd, et al., Mail Date: Apr. 27, 2023, 7 pages.

Boynuegri et al. "Effect of different localizations of microgap on clinical parameters and inflammatory cytokines in peri-implant crevicular fluid: A prospective comparative study" Clinical Oral Investigations; 2012; 16 (2):pp. 353-361.

Chu et al. "Managing esthetic challenges with anterior implants. Part 1: midfacial recession defects from etiology to resolution" Compendium of Continuing Education in Dentistry; Oct. 2013; vol. 34, Special Issue 7; pp. 26-31.

Chu et al. "The dual-zone therapeutic concept of managing immediate implant placement and provisional restoration in anterior extraction sockets" Compendium of Continuing Education in Dentistry; Aug. 2012; vol. 33, No. 7; pp. 524-534.

Ex Parte Quayle Action for U.S. Appl. No. 16/311,651, filed Dec. 19, 2018, on behalf of VP Innovato Holdings Ltd. Mail Date: May 29, 2019. 10 Pages.

Final Office Action for U.S. Appl. No. 16/626,852, filed Dec. 26, 2019 on behalf of VP Innovato Holdings Ltd. Mail Date: Jul. 6, 2022. 7 Pages.

International Preliminary Report on Patentability for International PCT App.No. PCT/IB2019/057325 filed on Aug. 30, 2019, on behalf of VP Innovato Holdings Ltd. Mail Date: Dec. 2, 2020. 19 Pages.

International Preliminary Report on Patentability for PCT Application No. PCT/GR2015/000029, filed on Jun. 12, 2015, on behalf of Vergoullis, Ioannis. Mail Date: Dec. 6, 2016. 66 pgs.

International Preliminary Report on Patentability for PCT/IB2017/053419, filed on Jun. 9, 2017, on behalf of VP Innovato Holdings Ltd. Mail Date: Sep. 6, 2018. 20 pages.

International Search Report and Written Opinion for International PCT Application No. PCT/IB2021/052724 filed on Apr. 1, 2021, on behalf of Vergoullis, Ioannis, Mailed on Jul. 1, 2021, 12 Pages.

International Search Report for International Application No. PCT/GR2015/000029, filed on Jun. 12, 2015, on behalf of Vergoullis, Ioannis. Mail Date: Oct. 5, 2015. 3 pgs.

International Search Report for International PCT App. No. PCT/IB2019/057325filed on Aug. 30, 2019, on behalf of VP Innovato Holdings Ltd. Mail Date: Nov. 28, 2019. 5 Pages.

(56) References Cited

OTHER PUBLICATIONS

International Search Report for PCT/IB2017/053419, filed on Jun. 9, 2017, on behalf of VP Innovato Holdings Ltd. Mail Date: Aug. 17, 2017. 5 pages.
International Search Report for PCT/IB/2018/055593 filed on Jul. 26, 2018 on behalf of VP Innovato Holdings Ltd. Mail Date: Oct. 23, 2018. 6 pages.
Non-Final Office Action for U.S. Appl. No. 15/318,085, filed Dec. 12, 2016, on behalf of Ioannis Vergoullis. Mail Date: Apr. 18, 2018. 17 pgs.
Non-Final Office Action for U.S. Appl. No. 16/146,457, filed Sep. 28, 2018 on behalf of VP Innovato Holdings Ltd. Mail Date: Apr. 21, 2021. 17 Pages.
Non-Final Office Action for U.S. Appl. No. 16/538,269, filed Aug. 12, 2019, on behalf of VP Innovato Holdings Ltd. Mail Date: Oct. 6, 2021. 15 Pages.
Non-Final Office Action for U.S. Appl. No. 16/626,852, filed Dec. 26, 2019 on behalf of VP Innovato Holdings Ltd. Mail Date: Apr. 12, 2022 20 pages.
Non-Final Office Action for U.S. Appl. No. 16/726,009, filed Dec. 23, 2019, on behalf of VP Innovato Holdings Ltd. Mail Date: Mar. 2, 2022. 21 Pages.
Non-Final Office Action for U.S. Appl. No. 16/726,009, filed Dec. 23, 2019, on behalf of VP Innovato Holdings Ltd. Mail Date: Nov. 9, 2021. 25 Pages.
Notice of Allowance for U.S. Appl. No. 15/318,085, filed Dec. 12, 2016, on behalf of GP Innovato Cyprus Ltd, Limassol, Cyprus. Mail Date: Aug. 27, 2018. 5 pgs.
Notice of Allowance for U.S. Appl. No. 16/146,457, filed Sep. 28, 2018 on behalf of VP Innovato Holdings Ltd. Mail Date: Jun. 23, 2021. 11 Pages.
Notice of Allowance for U.S. Appl. No. 16/626,852, filed Dec. 26, 2019 on behalf of VP Innovato Holdings Ltd. Mail Date: Aug. 8, 2022 5 pages.
Notice of Allowance for U.S. Appl. No. 16/311,651, filed Dec. 19, 2018, on behalf of VP Innovato Holdings Ltd. Mail Date: Jul. 15, 2019. 5 Pages.
Restriction Requirement for U.S. Appl. No. 16/146,457, filed Sep. 28, 2018 on behalf of VP Innovato Holdings Ltd. Mail Date: Nov. 6, 2020. 10 Pages.
Restriction Requirement for U.S. Appl. No. 16/626,852, filed Dec. 26, 2019 on behalf of VP Innovato Holdings Ltd. Mail Date: Jan. 24, 2022 8 pages.
Written Opinion for International Application No. PCT/GR2015/000029, filed Jun. 12, 2015, on behalf of Ioannis Gergoullis. Mail Date: Oct. 5, 2015, 5 pgs.
Written Opinion for International PCT App. No. PCT/IB2019/057325 filed on Aug. 30, 2019, on behalf of VP Innovato Holdings Ltd. Mail Date: Nov. 28, 2019. 8 Pages.
Written Opinion for PCT/IB2017/053419, filed on Jun. 9, 2017, on behalf of VP Innovato Holdings Ltd. Mail Date: Aug. 17, 2017. 9 pages.
Written Opinion for PCT/IB/2018/055593 filed on Jul. 26, 2018 on behalf of VP Innovato Holdings Ltd. Mail Date: Oct. 23, 2018.7 pages.

* cited by examiner

SCAN POSTS SYSTEM AND METHOD

CROSS REFERENCE TO RELATED APPLICATIONS

The present application is the US National Stage of International Patent Application No. PCT/IB2021/052724, filed on Apr. 1, 2021, which in turn, claims priority to Greece Application No. GR 20200100312, filed on Jun. 4, 2020.

TECHNICAL FIELD

This invention belongs to the field of tools used by dentists for operating in dental tissue, in order to manage the soft tissue around implants or similar operations.

STATE OF THE ART

The placement of a dental implant involves many operations, some of them being related to the manufacturing and handling of healing abutments and impression posts.

In some implant operations, when a dental implant is installed, it is convenient to place an adjacent scan post to provide external information about the evolution in the position and orientation of the dental implant, which is usually very difficult to obtain by external scan methods.

Scan posts are known to help dentists to calculate the location and orientation of a dental implant which has been installed in a patient's mouth. These scan posts are installed adjacent to a dental implant, and their shape is scanned by a device so that the orientation and the relative position of this scan post with respect of the rest of the teeth or another known reference is acquired. These data provide reliable information about the position and orientation of the dental implant which is not easily accessible.

Some documents provide ways of installing and measuring this information.

For example, in document EP 2462893 A1, a scanning member is provided, comprising a head portion with a flat top surface and a body portion which is non-rotationally coupled to the dental implant. The body portion is physically attached to a bottom surface of the head portion to form a generally "T" shape. This scanning member comprises at least two scan marks and also provides an internal through hole for receiving a screw to threadably couple with a threaded bore within the dental implant. By scanning the scanning member, the position and orientation of the hidden dental implant may be calculated. Anatomically shaped healing abutments that function as scan posts have been proposed such as the ones disclosed in PCT/EP2016/075507, or PCT/IB2019/057325

The problem the clinicians face with these components is the fact that the orientation of the prosthetic connection of the implant in the jaw restricts the orientation of the anatomical component-body of these scan posts. Some known scan posts, such as the ones disclosed in documents US 2013/196290 A1 or US 2015/173862 A1 may allow more than one different assembly position between the core and the body. However, the disclosed features provide limitations on the degree of orientation correction that can be achieved. This is an important problem, since the anatomical piece must be oriented with extreme accuracy in the jaw in order to match the shape of the future implant prosthesis that will be installed onto the implant at the gingival level. If the prosthetic connection of the implant is not perfectly oriented, then this goal cannot be achieved, and the resulting soft tissue conditioning will be wrong; fact that can make the use of these components impossible or even dangerous. The mere use of different size or shape components in order to overcome the problem of proper fit is not an adequate solution since every particular implant site needs specific shape and size soft tissue conditioning that must not be compromised. The only way such a problem could be solved is by utilizing scan posts that comprise a non-engaging prosthetic connection, so that the whole system core and body can rotate in space. However, this would make the scanning process useless, since the orientation of the prosthetic connection of the implant will not be able to be identified and it must be identified during the scanning process and incorporated in the process for the final prosthesis design and fabrication. Moreover, the engagement between scan post and implant during a healing period is fundamental to allow stable fit and avoid micromovement between the two elements that lead to unfavourable hard and/or soft tissue recession.

An improvement in the orientation possibilities is therefore sought.

DESCRIPTION OF THE INVENTION

The invention provides an alternative solution for this problem by means of a scan posts system according to claim 1, and a method according to claim 19. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a scan posts for being used in designing a dental implant prosthesis, the scans post comprising a scan post core comprising a prosthetic connection defining a connection axis, a pillar defining a pillar axis, a shoulder between the pillar and the prosthetic connection and a core mark;

a scan post body, adapted to be installed around the pillar of the scan post core and resting in the shoulder of the scan post core, the scan post body defining a body axis, wherein at least part of the scan post body is intended to be in contact with healing tissue; wherein the pillar comprises at least a portion of a cylinder which has an outer diameter;

the scan post body comprises a central cavity with a first portion having a cylindrical shape with a diameter such to fit the portion of a cylinder of the pillar, so that when the body is installed around the pillar, the scan post body is allowed to freely rotate around the scan post core with lateral stability; and the scan post further comprises fixing means to fix the scan post body to the scan post core when a desired position of the scan post body with respect to the scan post core is achieved.

This scan post presents a customizing attachment between the scan post body and the scan post core. The scan post body is installed and may rotate freely until the fixing means fix the position of the body with respect to the core. The angular position may be chosen freely, not being restricted by a particular number of positions.

The solutions presented by the aforementioned previous art documents, alone or in combination, only allow for certain degrees of corrections, like for instance in steps of 30° rotation. Thus, smaller (or intermediate) degrees of correction cannot be achieved. Even if a person skilled in the art increases the amount of engaging means present on the core or the body in the light of the aforementioned documents, the final effect can again not be the same with the one provided by the inventive scan post system since these engaging means must comprise certain dimensions in order to be able to function, where these dimensions will put a limit on the number of these means that can be added to the elements; Thus again they will provide for steps of orientation correction.

This fact make the scan post set of the invention suitable for helping the implant process occur in a more healthy way, since the scan post are intended to improve the healing process, since the ability of selecting the exact orientation of the scan post body with respect to the scan post core helps the tissue to grow in a more natural way, avoiding problems in further stages of this process. This scan post is helpful for manufacturing a dental implant prosthesis with anatomic sub-gingival and cervical profile. It is understandable that the central cavity of the scan post body can have alternative shapes, as will be defined later in particular embodiments, that will allow the desired function of the inventive scan post, such as a lunar shape, a cylinder with beveled walls, etc, these shapes being either symmetrical or asymmetrical. In some of the particular embodiments of the scan post, the minimum diameter of the scan post body is not larger than the maximum diameter of the shoulder of the scan post core.

The design of the proposed engaging means allows the reversible engagement between the two components and this provides the advantage of the same components to be re-used when needed; meaning if the scan body malfunctions then it can be disassembled from the core and the same core can be used with another body, or vice versa.

In particular embodiments, the scan post core further comprises a protrusion which protrudes a protrusion length from the pillar and the scan post body comprises a second portion which extends over at least 15° and has a shape such that allows the movement of the protrusion along the second portion.

The scan post core comprises a protrusion and the scan post body comprises two portions: a first portion is intended to house the main circular portion of the scan post core and a second portion is intended to house the portion of the scan post core which comprises the protrusion. Hence, this customizing attachment provides a continuous angular customization between the rotation position of the body with respect to the core in a scan post. There is no limitation in the number of degrees that the scan post body should have with respect to the scan post core, any number between 0 and the extension of this second portion, which may be chosen by the dental practitioner. The fit between the first portion of the central cavity of the scan post body and the portion of a cylinder of the scan post core provides lateral stability between the scan post body and the scan post core, due to the fit between the portion of a cylinder of the scan post body and the first portion of the central cavity of the scan post core.

In some particular embodiments, the second portion of the central cavity of the scan post body extends over at least 15°, particularly at least 30°, particularly at least 60°, particularly at least 120°, particularly at least 180°.

Any angular extension is suitable for the adjustment of the orientation of the scan post body with respect to the scan post core. The greater the extension angle, the easier this adjustment will be.

In particular embodiments, the second portion of the central cavity of the scan post body has a cylindrical shape with a diameter corresponding to at least the sum of the outer diameter and the protrusion length.

In these cases, the fit between the protrusion and the second portion of the central cavity cooperates with the fit between the portion of a cylinder of the scan post core and the first portion of the central cavity of the scan post body to provide lateral stability between the scan post body and the scan post core.

In some particular embodiments where the scan post core comprises a protrusion which protrudes a protrusion length from the pillar, the central cavity of the scan post body provides for a top and a bottom portion; where the bottom portion has a diameter smaller than the top portion and the bottom portion is intended to house the main circular portion of the scan post core that is located below the protrusion of the scan post core and the top portion is configured to house the portion of the pillar comprising the protrusion allowing the latter to freely rotate within this top portion. This bottom portion further comprises a recess configured to allow the free passing of the protrusion of the pillar. This recess allows the installation of the body on the core so that the protrusion of the pillar passes through the bottom portion until is finally located within the top portion of the central cavity, while at the same time the scan post body and the shoulder of the scan post core fit perfectly and form a continuous and derivable surface.

In some particular embodiments, the core mark provides the information for the three-dimensional location of the scan post core in space. This scan mark provides the information for the three-dimensional position and orientation of the core and thus of the three-dimensional position and orientation of the implant that is connected with, allowing the practitioner to freely position the body. In these cases, the scan mark of the scan post body is not necessary, or at least irrelevant to the implant position, since it only provides information for the scan post body orientation in space, which may be different from the orientation of the implant. In these embodiments, the scan post core may provide information about the position and orientation of the implant regardless the orientation of the scan post body, on the contrary to previous art documents, which disclose scan marks present on the body aiming to locate implant position and orientation and thus making impossible the functionality of such a scan post where the relationship between body and implant is not standardized.

Providing a scan mark on the core provides a very particular technical effect, because this is the element of the scan post system that has a constant relationship with the implant that is connected with. The core comprises a prosthetic connection that may have different geometry, depending on the implant systems. The prosthetic connection of the core matches with the connection of the implant in such a way that no rotation is allowed between the two elements. Thus, once the core is installed onto the implant, the resulting final assembly is standardized. The geometry of the prosthetic connection can allow different configurations which result in the same effect, since the geometry of the prosthetic connections is symmetrical. The scan mark on the core provides the information for this final three-dimensional configuration of assembly that includes the orientation and location of the implant's prosthetic connection and platform.

In some particular embodiments, the scan post core further comprises a cap, wherein the core mark is located in a position of the cap which depends on the position of the protrusion of the scan post core.

This makes the scan mark easier to be detected, since it is more available in the outer cap than directly located in the protrusion of the scan post core. It is understandable that the engaging means between the scan post core and the cap in particular embodiments could be different, meaning the core comprising a recess and the cap a protrusion, or any other surface geometry that can allow a stable, reproducible fit between the two elements.

The scan cap can be installed onto at least part of the core's pillar and within at least part of a housing of the scan post body, engaging at least part of the protrusion of the pillar. This scan cap comprises a scan mark that is located at the surface that engages the protrusion of the pillar. The scan mark of the scan cap has a stable relationship with the position of the protrusion when the scan post system is assembled. The goal of this scan cap is to "transfer" the scan mark of the core on a more coronal position that is easier to be identified and marked by the intra-oral scanner during the scanning process.

In some particular embodiments the scan marks present on the core, and, or the body and/or the cap are all identified and processed through suitable CAD-CAM software so that the final configuration, of the generated by the practitioner scan post after final assembly of all components, is achieved.

In some particular embodiments, the fixing means comprises a securing screw which is configured to securely attach the scan post body to the scan post core and to an implant. In other particular embodiments, the fixing means comprises a securing screw which is configured to securely attach the scan post body to the scan post core and an auxiliary securing screw configured to securely attach the scan post core to an implant. In the particular embodiments comprising a cap, the fixing means comprises a securing screw which is configured to securely attach the scan cap to the scan post body to the scan post core and an auxiliary securing screw configured to securely attach the scan post core to an implant.

Securing screws mean a reliable solution for this purpose. Since the scan post body may be freely rotated with respect to the scan post core, some fixing means are needed. One option is to use a sole screw for fixing the three, or four elements (body, core, or body, core cap and implant) and an alternative solution is to use one screw to fix the scan post body to the scan post core, or the scan cap to the scan body to the scan core and an auxiliary securing screw to attach the scan post core to an implant.

In some particular embodiments, the securing screw comprises an opening configured to allow the protrusion of the scan post core to be visible from outside the scan post.

In some particular embodiments, the protrusion of the scan post core stands out from the opening of the securing screw.

This allows the position of the protrusion to be visible by the practitioner. In those cases where the scan post core usually comprises a scan post mark, this embodiment is further advantageous since it provides the practitioner with the possibility to digitally scan the mark without removing the scan post body.

In some particular embodiments, the fixing means comprises glue or a friction fit connection.

In some particular embodiments, at least part of the scan post body and the shoulder of the scan post core form a continuous and derivable surface.

In each of the scan bodies, the surface formed by the shoulder and the scan post body is intended to be in contact with healing tissue when this tissue grows around the installed scan body. Hence, this scan post can further assist with proper shaping of the healing soft tissue according to the desired cervical and sub-gingival shape of the final prosthesis and accurately recording the latter through a digital intra-oral scanning process.

In some particular embodiments, the continuous and derivable surface formed by the scan post body and at least part of the scan post body comprises a convex portion and a concave portion, the concave portion being closer to the prosthetic connection than the convex portion.

This structure of convex and concave portions is natural for the healing tissue, thus contributing for a natural healing process.

In some particular embodiments, the pillar axis and the connection axis cut each other and form an angle comprised between 1 and 45°. Once the scan post body is installed around the scan post core, the body axis will not be parallel to the connection axis, but will also form some angle, although it may be different from the angle formed between the pillar axis and the connection axis. These embodiments will be called "angulated" scan post installation and are useful when the shape of the edentulous space is not suitable for installing a straight scan post.

In some particular embodiments, the pillar axis and/or the connection axis is parallel to the body axis and is arranged at a distance between 1 and 20 mm therefrom. This will provide for an "off-set", or "eccentric" scan post installation.

In some particular embodiments, each scan post body further comprises second retention means and the scan post core comprises second reception means, the second retention means being arranged to abut against the second reception means to reversibly block the movement of the scan post body with respect to the scan post core in a direction parallel to the pillar axis, while at the same time allowing the free rotation of the scan post body with respect to the scan post core.

This provides stability between the body and the core, preventing a vertical movement between them.

In some particular embodiments, the second retention means comprises a protruding arc extended along a part of the second portion of the scan post body, and the second reception means comprises a recess performed in the protrusion of the scan post core, in such a way that the protruding arc has a height equal to the height of the recess.

In some particular embodiments, the second retention means comprises a recess extended along part of the first portion of the scan post body, and the second reception means comprises a second protrusion of the scan post core, in such a way that the second protrusion has a height equal to the height of the recess.

With these particular embodiments, the practitioner may install the body on the core and rotate until the second retention means engage with the second reception means, then the body may be freely rotated with respect to the core to reach the desired orientation. In this movement, the common height of the recess and the protruding arc will prevent the scan post body from moving in a direction parallel to the pillar axis.

In some particular embodiments, there is a cross section to the scan post body perpendicular to the body axis which cuts both the first portion and the second portion of the central cavity. In other embodiments, the central cavity of the scan post body comprises a beveled wall which connects the first portion and the second portion, so there is not any cross section perpendicular to the body axis which cuts both the first portion and the second portion of the central cavity, because the first portion and the second portion are separated by the beveled wall.

These are alternative options to achieve the technical effect of the invention. It is understood that the design of the proposed engaging means allows the reversible engagement between the body and the core and this provides the advantage of the same components being able to be disassembled and to be re-used when needed; meaning if the scan body malfunctions then it can be disassembled from the core and the same core can be used with another body, or vice versa. Moreover, the scan post core can be maintained installed onto the implant and the scan post body and/or cap can be uninstalled from the core and be replaced by the final implant prosthesis that will now be supported by the scan post core.

In some particular embodiments, the scan post body comprises two different parts attached to each other by means of mechanical and/or chemical retention means.

In some particular embodiments, these two parts are arranged one inside the other one, so that a first part reproduces the internal geometry of the scan post body while the second one reproduces the external geometry of the scan post body. These two parts may be produced by milling and then may be coupled and attached by means of mechanical and/or chemical bonding with, or without suitable bonding agent, such as glue. Alternatively, these parts may be produced by injection molding where the first part is installed onto the scan post core present in a suitable well of a mold that comprises wells with anatomical shape and a suitable material is injected within the well so that it covers at least part of the first part without engaging the scan post core. Once the material is set, it will form an anatomical external shape that has become one piece with the first part or a separate piece that will then be attached to the first part.

In a second inventive aspect, the invention provides a scan post system suitable for being used in designing a dental implant prosthesis, the scans post system comprising a plurality of scan post cores according to the first inventive aspect, wherein the system comprises at least four different scan post bodies with at least two different shapes with two different sizes and at least one height.

This invention provides a set with a plurality of scan posts portions. Each scan post comprises one scan post core and one scan post body, but one single scan post core may be attached with different scan post bodies, there is no need that there is the same number of scan posts cores than of scan posts bodies. The scan post core of each scan post could be substantially the same: the scan post is characterized by the scan post body, which is different from the scan post body of a different scan post of the system. These scan bodies are selected from a group of scan bodies which comprises a combination of different features. For example, if the group of scan bodies comprises three different sizes, two different shapes and two different heights, the scan body system comprises 12 different scan posts. The scan post core of each one the 12 scan posts are substantially identical, but each scan post comprises a scan body which is selected from this group of 12 scan post bodies. As a consequence, the most suitable scan body may be selected to be part of the dental implant prosthesis design process, depending on the shape of the patient's jaw and natural dentition.

It is understandable that the above system could also be available in a more or less simplified format comprising a smaller or a greater number of components. The shapes and dimensions of anterior teeth and premolars are very similar, so the dental practitioner could prefer using a combo shape so that a set of three components (same shape but 3 different sizes) would be able to closely mimic these shapes in a satisfactory manner. The same applies for the shapes of maxillary and mandibular molars. Thus a system comprising six scan bodies (three for anterior and premolars with sizes small, medium, large and three for molars, small medium, large) could cover the basic needs of most clinical cases in an acceptable fashion, while reducing the number of components and thus the cost of the system for the dentist.

It is also understandable that the components of the system could be available in the market also as separate pieces so that a dentist can purchase when needed only the scan post in need for his clinical case. If for example one of the scan posts of the system is lost or malfunctions, then the dentist will be able to replace this specific scan post in need.

In some particular embodiments, the second portion extends over at least 180°.

Providing this second portion with 180° extension on the body covers all possible clinical cases since the core itself can be installed onto the implant in more than one positions as these possibilities relate to the geometry of its prosthetic connection. Thus, by doing so the final orientation of the body can be literally achieved in 360° by simply installing the core in an opposite direction. This embodiment allows a controlled range of rotation. However, it is understandable that the second portion can always be increased further than 180° if clinical needs dictate so in the future.

The proposed invention refers to scan posts that comprise a body with anatomical shape, meaning no cylindrical. This shape can vary, being symmetric or asymmetric, regular or irregular, in an effort to match the shape and dimensions of at least of part of the crown and, or the root trunk of the natural teeth as close as possible.

The inventive scan post could comprise one shape and, or size only, but it is understandable that in order to achieve a superior system that can cover all different clinical cases, a set of scan posts with different shapes and, or sizes is needed.

In some particular embodiments, the system comprises at least eighteen different scan post bodies with at least three different shapes with three different sizes and more than one height; and wherein each scan post body comprises at least one scan mark suitable for providing information about the shape, size and height of the scan post body to a scanning device, this information being useful for designing a dental implant prosthesis.

In some particular embodiments,
  the shape of the scan body of each scan post is defined by
    a cross section in a plane perpendicular to the pillar axis which crosses the scan post at its maximum equivalent diameter,
  the equivalent diameter is the maximum distance between two points belonging to said cross section, and
  this cross section is, for each scan post, one of a triangle with rounded edges, a square with rounded edges, a parallelogram with rounded edges or an ovoid.

Scan bodies are therefore identified by the shape thereof in the portion with the maximum equivalent diameter, which is usually the top portion of the scan body, the portion which is farthest from the prosthetic connection. This way of identifying the main shape of the scan body is an easy way of choosing a preliminary shape for each particular type of tooth.

The shapes of a triangle with rounded edges, square with rounded edges, parallelogram with rounded edges or ovoid are a way of defining these shapes. As may be seen throughout the document, the "ovoid" shape has four curved sides with four rounded corners, but any other suitable shape may be chosen in order to adjust to the edentulous space.

The scan post bodies have a cross section which may vary in size and/or shape while advancing upwards from the shoulder, but all cross sections are oriented according to parallel planes, which are perpendicular to the pillar axis. These types of cross sections adapt to the dental pieces in a very good way. Triangles with round edges, squares with round edges and rectangles with round edges are examples of shapes which may adapt to the cervical portion of the patient's edentulous space.

In some particular embodiments, the height of the scan body of each scan post is defined by the distance between the cross section of the scan post with minimum equivalent diameter and the cross section of the scan post with maximum equivalent diameter, wherein the equivalent diameter is the maximum distance between two points belonging to said cross section, and particularly wherein this height is classified in ten different heights, namely 2.5 mm, 3.0 mm, 3.5 mm, 4.0 mm, 4.5 mm, 5.0 mm, 5.5 mm, 6.0 mm, 6.5 mm and 7.0 mm. It should be understood that these heights are just a particular example based on currently available data and can be further adjusted or enriched if clinical needs in the future demand to do so.

The relevant height of a scan post is not always the total height thereof. The distance between the plane with maximum equivalent diameter and the plane with minimum equivalent diameter is a good indicator, since the maximum equivalent diameter defines the width of the scan post and the future dental implant prosthesis.

Depending on the features of patient's teeth, it will be suitable to choose a scan post belonging to one of these height categories.

In other particular embodiments, the height of the scan post system is defined from the height of the scan post core's shoulder.

These alternative embodiments are useful when an alternative methodology is used.

In some particular embodiments, the size of the scan body of each scan post is defined by the equivalent diameter of the cross section of the in a plane perpendicular to the pillar axis which crosses the scan post at its maximum equivalent diameter, wherein the equivalent diameter is the maximum distance between two points belonging to said cross section, this size being classified into at least three categories, the small one being comprised between 4.5 and 6 mm, the medium one being comprised between 6.5 and 8 mm and the big one being comprised between 8 and 12 mm.

The size of the scan post body is another key feature, which is chosen depending on the type of the tooth and on the patient itself. In particular cases, this size category depends on the shape of the scan post. For example, a triangular shape will be available in three sizes, a small size of 4.5 mm, a medium size of 6 mm and a large size of 7 mm. But another shape, such as a parallelogram size, may be available in a small size of 6 mm, a medium size of 7 mm and a large size of 8 mm.

In other particular embodiments, the size of the scan post system is defined from the size of the prosthetic connection and/or from the diameter of the scan post core's shoulder.

In some particular embodiments, at least some scan post bodies have different shapes at different cross sections perpendicular to the pillar axis, and wherein the scan marks comprise information about these different shapes and the distance of the perpendicular planes from the top of the scan post body.

The anatomical shape of a scan post may be therefore chosen, not only by the main shape, which is defined by the shape in the cross section with maximum equivalent diameter, but also by intermediate shapes, which may be different from this main shape. This information is encoded by the scan marks so that the dental practitioner may have complete information of the scan post which has been placed in the patient's mouth.

In some particular embodiments,
  at least some scan post bodies have a circular cross section in a plane perpendicular to the pillar axis which crosses the scan post body at its minimum equivalent diameter, wherein the equivalent diameter is the maximum distance between two points belonging to said cross section; and
  the scan mark is configured to provide information about the size and height of the circular cross section.

The root trunk is a portion of the tooth root which has a vertical dimension of several millimeters. The crown of the tooth has a portion called cervical margin, which is located at the level of the free gingival margin. The cervical portion usually has a vertical dimension between 0.5 and 2 mm. The scan posts of the invention are adapted to fit these two portions and can comprise a body with anatomical shape, which means different from a cylindrical shape, where this anatomical shape can be symmetric or asymmetric, regular or irregular.

A circular cross section in this location with minimum equivalent diameter, which is usually the portion which is closest to the shoulder, is advantageous, since the anatomical profile is mostly needed at the area of the gingival margin that will receive the cervical margin of the implant prosthesis. Below this area there is a transition zone which coincides with this zone with minimum equivalent diameter, wherein maximum tissue thickness is desired and a circular cylindrical shape is advantageous to provide the least diameter circumferentially in comparison to other shapes.

Scan marks help the practitioner when identifying scan posts which have this "combo shape", since the healing tissue may have grown to such a height that visual identification provides no help to determine the best shape for the dental implant prosthesis.

In a second inventive aspect, the invention provides a method of manufacturing dental implants prostheses, the method comprising the steps of
  attaching a scan post core belonging to a scan post according to the first inventive aspect to a dental implant present in an edentulous space;
  placing a scan post body belonging to the scan post around the scan post core;
  rotating the scan post body with respect to the scan post core until the scan post body reaches a correct orientation;
  fixing the scan post body with respect to the scan post core;
  letting healing tissue grow around the scan post body;
  scanning the scan post scan marks to obtain the position and orientation of the scan post and a map of the healing tissue around the scan post body; and manufacturing a dental implant prosthesis with the information obtained in the previous step, wherein at least part of the implant prosthesis is a replicate of the scan post body.

Processes known by the skilled person include using a temporary prosthesis placed on the implant and allow the tissue grow around it. However, when the scan post used in these methods is cylindrical, and this does not fit the sub-gingival tissue which has grown around the temporary prosthesis. As a consequence, the scanning process cannot obtain data of the gap between the sub-gingival tissue profile and the shape of the scan post. With the method of the invention, this problem is solved, since the same element is used for the tissue to grow around it and for the scanning process, ensuring that the sub-gingival tissue has the suitable profile which matches the profile of the scan post. As a consequence, the dentist can manufacture a final prosthesis which will match perfectly to both the sub-gingival profile and the healing tissue, and this by using a single scanning process.

When the scan post is scanned, the scanner identifies, due to the scan marks, the shape of the scan post. Further, the scanner also acquires a map of the healing tissue. The combination of the map of the healing tissue profile and the shape, size and orientation of the scan post provides the practitioner with information to manufacture a suitable dental implant prosthesis. The shape and size of the scan post is included in a digital library, and the scan marks allows the identification of the particular model of the digital library, so that the use of some processing means may lead to achieve the complete shape of the most suitable dental implant prosthesis.

In some particular embodiments, before fixing the scan post body and after rotating the scan post body, the method further comprises the steps of
placing a scan cap around the scan post core filling at least part of a housing comprised in the scan post body and engaging at least part of the protrusion of the pillar; and
fixing the scan post cap with respect to the scan post body.

This particular method solves some difficulties which may appear for clinicians utilizing less effective intra-oral scanners of previous generations. These scanners might present difficulties identifying the scan mark present on the core of the scan post system. In these cases the methodology can be further enhanced by the utilization of the inventive scan cap and by following this particular method.

The invention also comprises an alternative method of manufacturing dental implants prostheses, the method comprising the steps of
attaching a scan post core belonging to the scan posts system according to the first inventive aspect to a dental implant present in an edentulous space,
placing a scan post body belonging to the scan posts system around the scan post core;
rotating the scan post body with respect to the scan post core until the scan post body reaches a correct orientation;
fixing the scan post body with respect to the scan post core;
letting healing tissue grow around the scan post body;
removing the scan post body from the scan post core;
scanning the scan mark present in the scan post core to obtain the position and orientation of the scan post and a map of the healing tissue around the scan post core; and
manufacture a dental implant prosthesis with the information obtained in the previous step.

This alternative method is provided because today in the dental filed there is available software that will not allow the proper matching of the scan marks present on the core and the body or the cap, in order to be able to digitally match the different components and configure the final format of the scan post system as the latter is present in the mouth. The proposed methodology allows clinicians that only have access to this type of software to be able to use the inventive scan post system and provide a reliable solution. The scanning of the core will provide the necessary information for the identification of the 3D location of the core and thus of the implant in space, while the soft tissue is directly mapped. The disadvantage of this methodology is that it requires the removal of the body for the scanning process to take place, but it is an acceptable limitation for the clinician that does not have access to new generation software.

In some particular embodiments, between the steps of scanning the scan post marks and manufacturing a dental implant prosthesis, the method further comprises the steps of
providing the scan data to a cad station comprising the available digital library that comprises the design information of the said scan post; and
designing an implant prosthesis where at least part of the prosthesis that is located at and/or below the free margin of the gingival tissue is a replicate of the corresponding portion of said scan post in shape and dimensions.

The thus manufactured prostheses can be now delivered directly on the scan post core present in the mouth after the scan post body and/or scan cap are removed. The design of the scan core, comprising a pillar with a protrusion, provides for the necessary anti-rotational feature that the prosthesis needs in order to be properly and securely engaged. Thus, an additional advantage of the inventive scan post system is that the core can also serve as a final abutment capable to support the final prosthesis. This eliminates extra costs but most importantly eliminates the need to connect and disconnect components from the implant. This is scientifically proven to be advantageous for long term stability of the peri-implant tissues.

Current practice, after soft tissue has been anatomically modeled by a temporary prosthesis, requires one additional, separate scanning of the soft tissue architecture. This is because the sub-gingival portion of the current scan posts do not carry an anatomical design, but instead they comprise a cylindrical design that does not match the one of the modeled gingival tissue. The inventive scan post models the tissue directly and eliminates need of using a temporary prosthesis for this purpose. Since the sub-gingival portion of the inventive scan post perfectly matches the shape of the sub-gingival tissue there is no need for a separate scanning in order to get the mapping of the latter. This feature reduces the working time and complexity of the procedure.

In some particular embodiments, the scan post body is chosen from the scan post system after measuring the distance between the dental implant platform and a cervical margin location and/or the cervical margin of the future prosthesis, either directly on the patient's mouth or extra-orally in a stone working model, or a digital working model or a CT scan, or a CBCT scan, or a combination thereof. In these cases, based on the selection of the proper inventive scan post a digital model can be fabricated, representing the jaw of the patient, the location of the implants and the selected scan posts installed onto the latter. This digital model can be exported as an STL file and sent to a lab so that the latter can pre-fabricate a final prosthesis where the cervical and/or the sub-gingival design of the prosthesis is the replicate of the selected inventive scan post.

This distance, between the dental implant platform and a cervical margin location, is important, since it will define the height of the scan post to be chosen. As had been defined before, this height is the distance between the plane with the minimum equivalent diameter and the plane with the maximum equivalent diameter. The cervical margin shape and size of the future prosthesis is also important as it will define the shape and size of the scan post body to be chosen.

As had been defined before,
the shape of the scan body of each scan post is defined by a cross section in a plane perpendicular to the pillar axis which crosses the scan post at its maximum equivalent diameter,
the equivalent diameter is the maximum distance between two points belonging to said cross section, and
this cross section is, for each scan post, one of a triangle with rounded edges, a square with rounded edges, a parallelogram with rounded edges or an ovoid.

The scan post core, body, cap and securing screws can be made out of the same or different materials, at least one of titanium, zirconia, PEEK, plastic, stainless steel, metal, aluminum, metal alloy or any other suitable material approved to be used intra-orally.

The scan post system may also comprise digital libraries which store the virtual configurations of all of the parts of the scan post system along with their negative replications, and also their assembly configurations with different implant systems. The digital libraries may further comprise different types, sizes and shapes of teeth where at least part of them is the exact replication of at least part of the scan post system.

The informative scan marks of the inventive scan post system can be using the binary-coded type of system or other types of coded systems. The scan marks of the core and/or the cap are configured to be aligned with a known anti-rotational engaging surface of the prosthetic connection of the core which is matted with the one of the prosthetic connection of the implant. Thus, once the core is fixed to the implant and cannot further rotate, said scan marks provide the information of said prosthetic connection's engaging surface location and orientation in space. These scan marks also provide the information for the three-dimensional location of the implant in space since the matching between core and implant in space standardized. It is important to mention here that the prosthetic connection of the implant can have different geometry between one and another implant system. The core of the scan post system comprises a prosthetic connection that is the negative replication of the prosthetic connection of the respected implant system, so that the two components match, and no rotation is allowed. This geometry can allow several configurations of assembly between implant and core, for example a hexagonal connection, will allow 6 positions of assembly, however since these positions will always be symmetrical the clinical effect remains the same. Thus, the identification of one of the engaging surfaces of the prosthetic connection (e.g. flat seat of the hexagon) by the scan marks of the core and/or cap is sufficient to provide the information needed.

The scan mark/s present on the body of the scan post system provide information with regards to location and orientation of the body in space. There is available software that allows through special algorithms the matching of the scan mark of the body and the scan mark of the core and, or the cap in order to provide the virtual configuration of the scan post system. Since the inventive scan post system allows the rotation of the body with respect to the core, a clinician can literally by using the same components end up to 180°-360° different configurations of scan post. The software allows by proper matching of the said scan marks the identification and virtual representation of the specific configuration used by the clinician in any particular case. The inventive scan post system can use specialized software where the scan mark axis of the scan post system that is located at the level of its scan mark provides for a virtual reference point and the scan post body comprises at least three scan marks that are located asymmetrically, where any specific rotation of the body provides for specific angular relation of the three scan marks in relation to the core mark axis which, thus providing for all necessary information with regards to final virtual configuration of the scan post system.

The inventive scan post system can be used for aiming in the design of single implant prostheses and also for multiple unit prosthesis supported by abutments with engaging and non-engaging prosthetic connections.

The inventive scan post system can be used with conventional impression techniques, where the stone model generated by an analogic impression, represents the inventive scan post and marks. This stone model can be scanned by an extra-oral scanner and the inventive scan post marks provide the information with regards to 3D position and orientation of the scan post and thus of the implant along with soft tissue topography and related features of the patients mouth.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
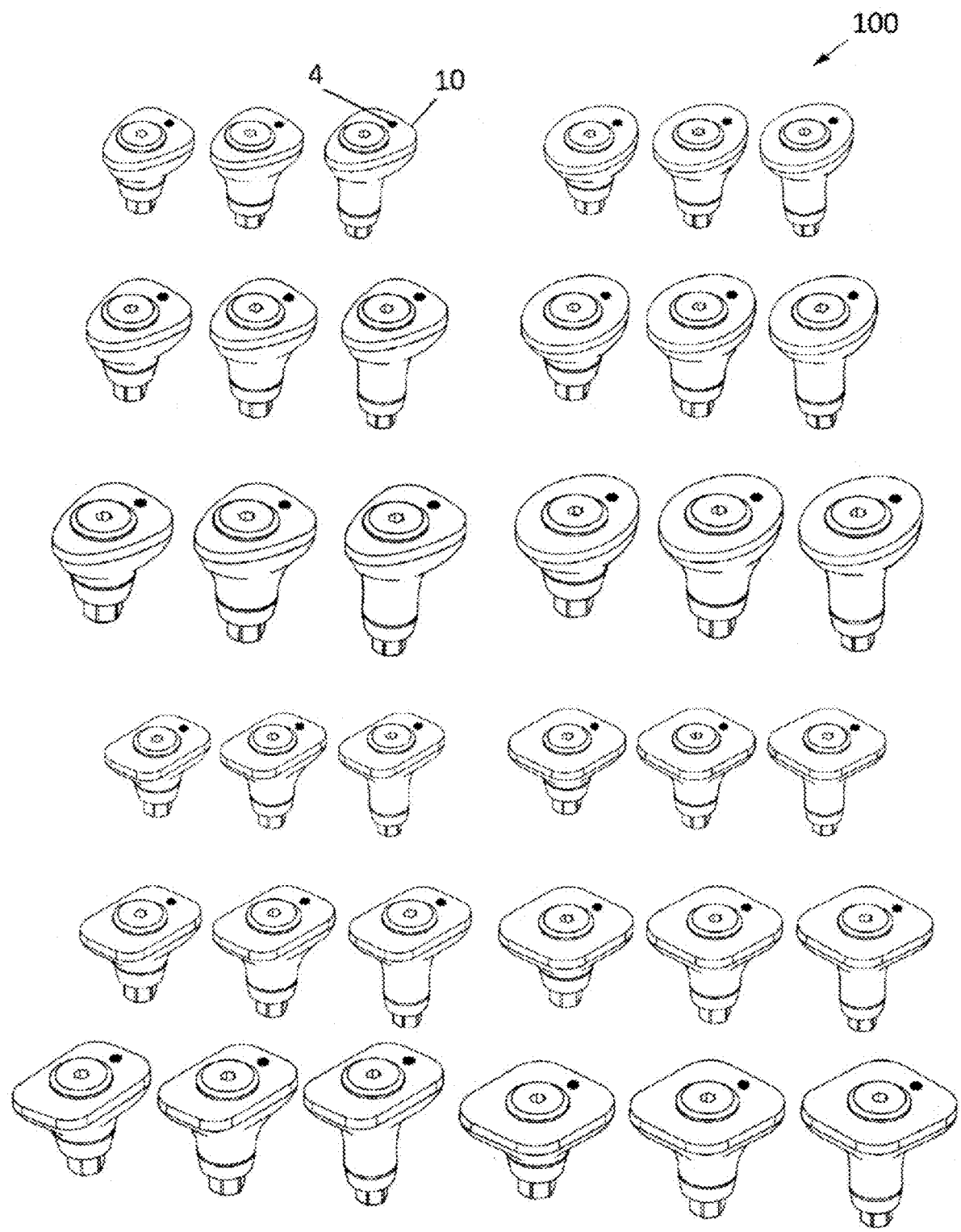
FIG. 1 shows a generic view of a scan posts system according to the invention.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows a generic view of a scan posts system 100 according to the invention. This scan post system is suitable for being used in designing a dental implant prosthesis.

As will be shown below, each scan post belonging to the scan posts system comprises a scan post core and a scan post body. The scan post body is different for each scan post, while the scan post core is substantially the same for each scan post.

This system 100 comprises 36 scan posts 10, which responds to the combination between four different shapes (rectangular with round edges, triangular with round edges, ovoid and square with round edges), three different sizes (small, medium and large) and three different heights (short, medium and long).

Every scan post 10 comprises several scan marks 4, one of them containing information about the shape, the size and the height of the scan post 10, which may be easily read and interpreted by a scanning tool. Further, other scan marks will be also useful for the scanning tool to provide position and orientation information of the scan post 10.

Figure 2:
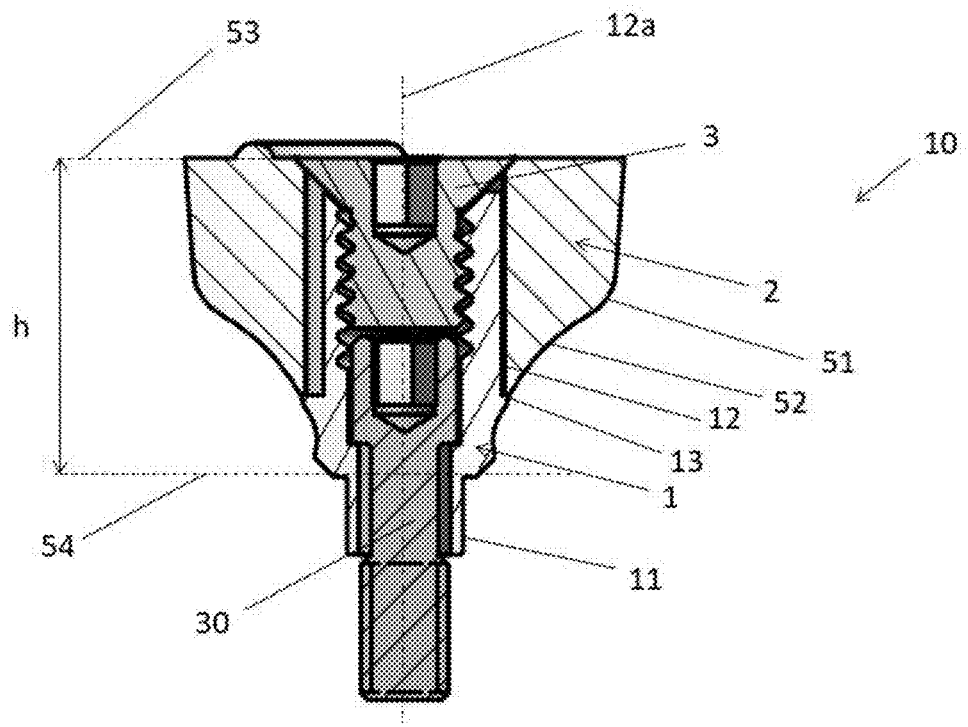
FIG. 2 shows a vertical section view of a particular embodiment of a scan post according to the invention.

FIG. 2 shows a vertical section view of a particular embodiment of a scan post 10 belonging to a scan posts system according to the invention.

This scan post 10 comprises a scan post core 1 and a scan post body 2. The scan post core 1 comprises a prosthetic connection 11, a pillar 12 defining a pillar axis 12*a* and a protruding shoulder 13 between the pillar 12 and the prosthetic connection 11. The scan post body 2 in turn surrounds the pillar 12 and rests in the shoulder 13. This scan post body 2, or at least part of it, is intended to be in contact with healing tissue. The scan post 10 further comprises a retention screw 3 which is configured to provide a secure attachment between the scan post body 2 and the scan post core 1. An auxiliary securing screw 30 is used to provide a secure attachment between the scan post core 1 and an implant (not shown in this figure). In different embodiments, the same securing screw is used to securely attach the scan post body to the scan post core and to an implant. In yet different embodiments, other fixing means, such as glue or a friction fit connection is used to attach these elements.

The lateral surface of the scan post body and the shoulder form a continuous and derivable surface. This surface comprises a convex portion 51 and a concave portion 52, the concave portion 52 is closer to the prosthetic connection 11 than the convex portion 51.

The height h of the scan body of this scan post is defined as the distance between the plane with minimum diameter and the plane with maximum diameter. In this figure, these planes are seen as lines 53, 54, since they are perpendicular to the pillar axis 12*a*.

Figure 3:
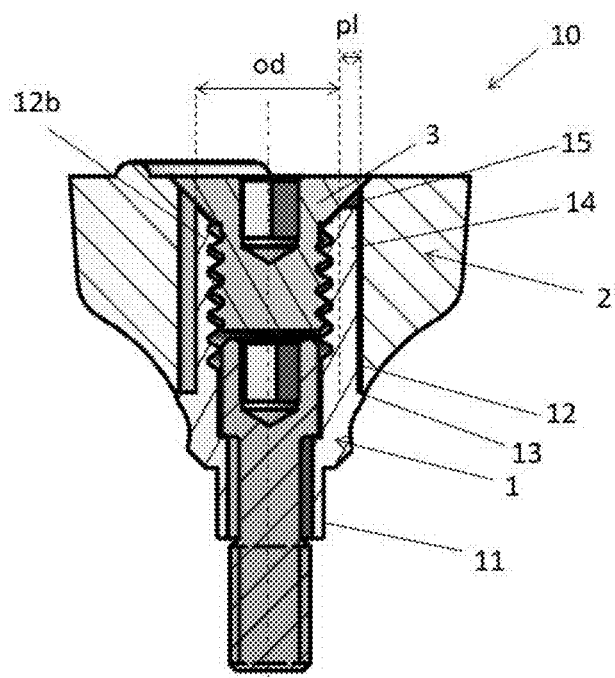
FIG. 3 shows the same scan post as shown in FIG. 2, but to show different features.

FIG. 3 shows the same scan post 10 as the FIG. 2, but to show different features.

In this figure, the pillar 12 comprises a portion of a cylinder 12*b* which has an outer diameter od and a protrusion 14 which protrudes a protrusion length pl from the pillar 12. In this figure, the protrusion 14 is shown to the right, and comprises a protrusion mark 15 on top thereof.

Figure 4:
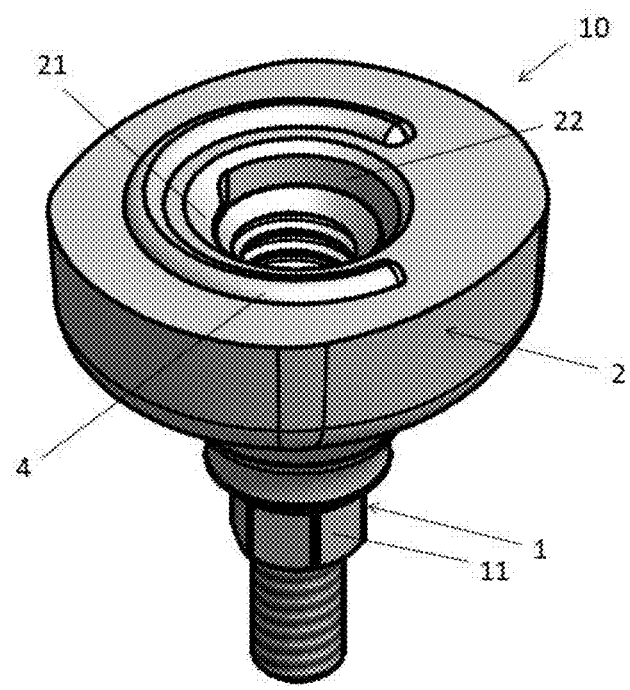
FIG. 4 shows a perspective view of a particular embodiment of a scan post according to the invention.

As shown in FIG. 4, the scan post body 2 comprises a central cavity with a first portion 21 having a cylindrical shape with a diameter substantially identical to the outer diameter of the cylinder of the pillar and a second portion 22 which extends over 180° and has a cylindrical shape with a diameter corresponding to the sum of the outer diameter and the protrusion length. With this shape, the first portion 21 is suitable to receive the portion of a cylinder of the pillar while the second portion 22 is suitable for letting the protrusion (not shown in this figure) to freely rotate so that the scan post body 2 may be oriented in different orientations with respect to the scan post core 1.

As is clearly shown in this picture, there is a cross section to the scan post body perpendicular to the body axis (i.e. a horizontal plane) which cuts both the first portion and the second portion of the central cavity, since both first and second portions are located at the same height of the scan post body.

This scan post 10 comprise one mark 4 located on top of the scan post body 2, but any other location would be suitable as well. This scan mark 4 is capable of providing the necessary information for identifying the three dimensional position of the said scan post in the jaw, since the scan post body comprising a non-circular shape provides reference points due to its shape that, in combination with the scan mark, are enough to provide all the necessary information needed to the CAD-CAM station.

Figure 5:
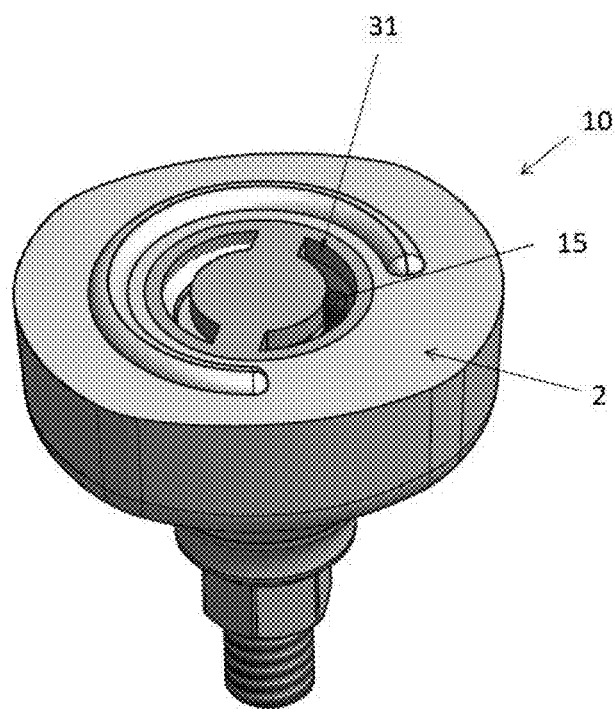
FIG. 5 shows a perspective view of a particular embodiment of a scan post according to the invention.

FIG. 5 shows a particular embodiment of a scan post 10 according to the invention, where the securing screw 3 comprises an opening 31 configured to allow the protrusion and the protrusion mark 15 of the scan post core to be visible from outside the scan post. This is useful so that there is no need to remove the scan post body 2 to scan the position of the protrusion mark 15.

Figure 6:
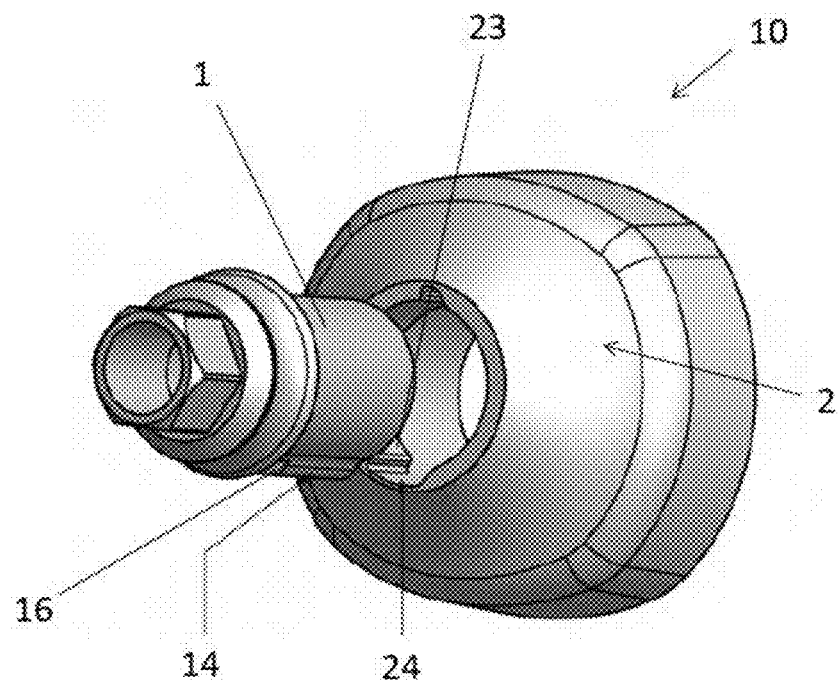
FIG. 6 shows a particular feature which may be comprised in any of the scan posts according to the invention.

FIG. 6 shows a particular feature which may be comprised in any of the scan posts according to the invention.

In this figure, it may be seen how the scan post body comprises a protruding arc 23 and the scan post core comprises a recess 16. The protruding arc 23 and the recess 16 are configured to match due to the fact that they have the same height (measured in the direction of the pillar axis), thus reversibly blocking the movement of the scan post body 2 with respect to the scan post core 1 in a direction parallel to the pillar axis, while at the same time allowing the free rotation of the scan post body 2 with respect to the scan post core 1.

The protruding arc 23 extends only along a part of the second portion of the scan post body, leaving a free space 24 so that the protrusion is introduced. Once the protrusion is introduced, the protruding arc 23 and the recess 16 are at the same height and the blocking may take place by the rotation of the scan post body with respect to the scan post core.

Figure 7:
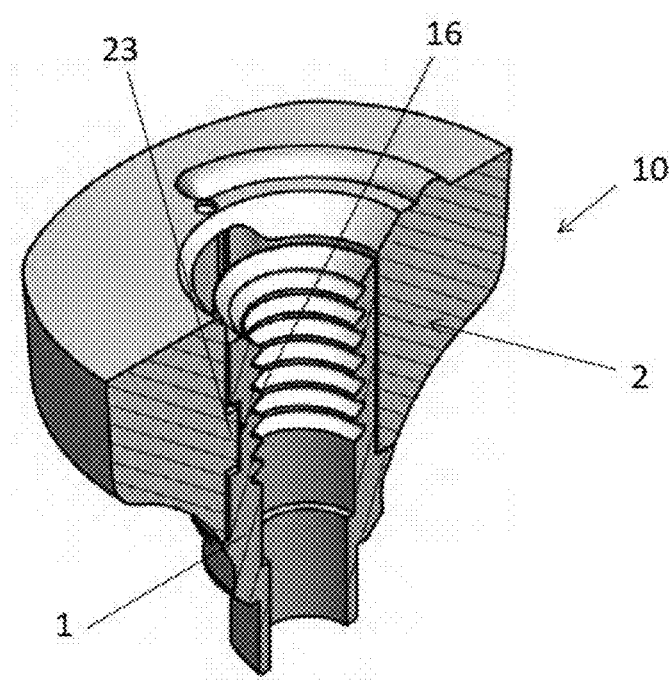
FIG. 7 shows an alternative of the feature illustrated in FIG. 6.

FIG. 7 shows an alternative of the feature illustrated in FIG. 6. In this case, the protruding arc 23 and the recess 16 are not located adjacent to the shoulder of the core, but at a height which is located approximately in the middle of the protrusion.

This makes the recess 16 to be fitted between two protrusions of the pillar, thus increasing stability.

Figures 8A, 8B:
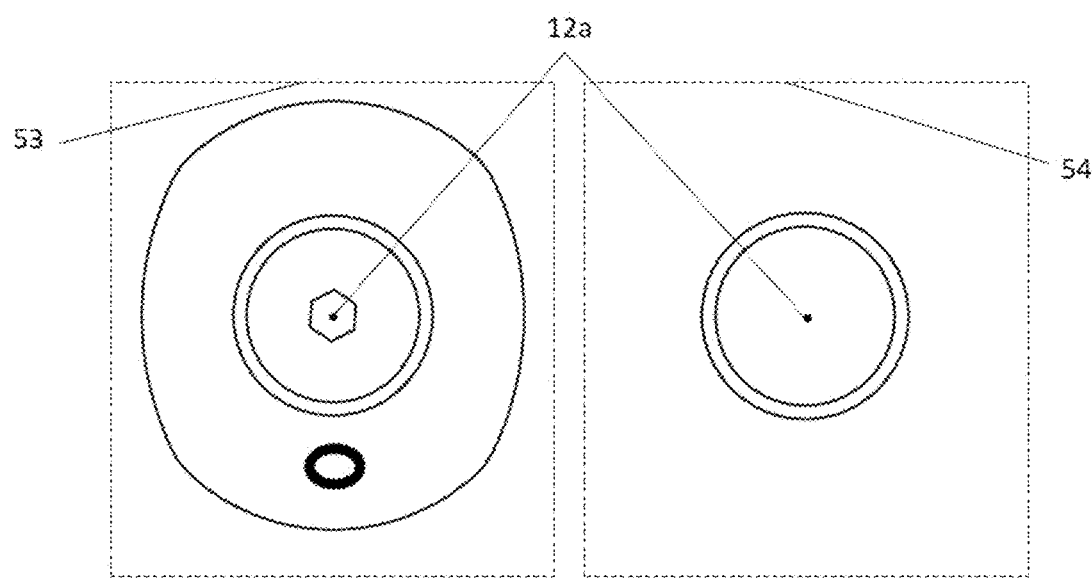
FIG. 8a shows a cross section of a top portion of a scan post body of a scan post system according to the invention.
FIG. 8b shows a cross section of a bottom portion of a scan post body of a scan post system according to the invention.

FIGS. 8a and 8b show different cross sections of this scan body 10, the two of them being according to these aforementioned planes of maximum and minimum equivalent diameter. The cross section shown in FIG. 8a is made according to the plane 53 where the equivalent diameter is the maximum one, and in this case corresponds to the top portion of the scan post body. The cross section shown in FIG. 8b is made according to the plane 54 where the equivalent diameter is the minimum one, and in this case corresponds to the bottom portion of the scan post body.

The equivalent diameter is considered as the maximum distance between two points belonging to said cross section.

FIG. 8a shows the cross section of a particular example of a scan post where the shape in this maximum equivalent diameter section is an ovoid with rounded edges.

FIG. 8b shows in turn the cross section of the same scan post wherein the shape in this minimum equivalent diameter section is a circle.

The size of the scan body of each scan post is defined by the equivalent diameter of the cross section of the scan body in a plane perpendicular to the pillar axis which crosses the scan post at its maximum equivalent diameter. As a consequence, in this case, this scan post would be considered as an ovoid scan post. However, the rounded cylindrical shape in the bottom portion is advantageous, since maximum tissue thickness is desired in this zone and a circular cylindrical shape is advantageous to provide the least diameter circumferentially in comparison to other shapes.

This scan post starts with a cylindrical shape and then expands laterally upwards in a concave manner till it reaches its maximum diameter and at which point comprises a generally ovoid shape with rounded edges. The vertical location of the maximum diameter and thus the location of the anatomical shape may be different in the different groups and within the same group of shapes. The inventive custom scan posts comprise marks that additionally provide this information.

This size may be classified into at least three categories, the small one being comprised between 4 and 6 mm, the medium one being comprised between 6.5 and 8.5 mm and the big one being comprised between 9 and 12 mm.

Figure 9A:
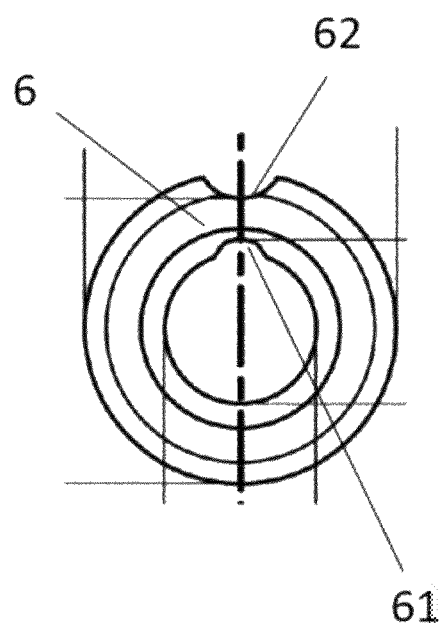
FIG. 9a shows the feature of a cap to be installed in a scan post according to the invention.
Figure 9B:
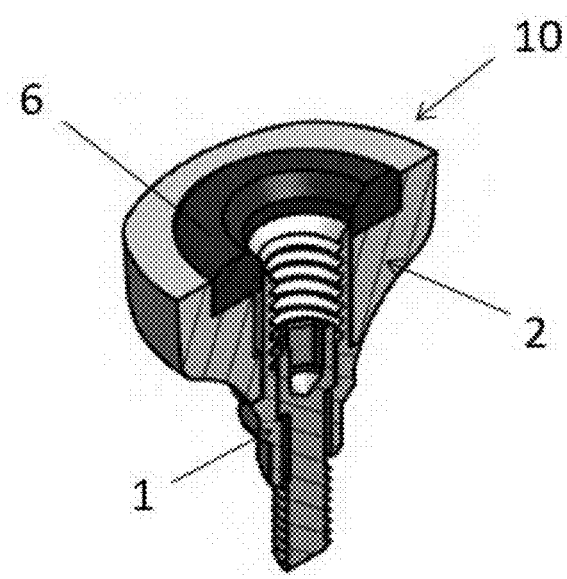
FIG. 9b shows the feature of a cap to be installed onto at least part of a core's pillar and within at least part of a housing of a scan post body according to the invention.

FIGS. 9a and 9b show the feature of a cap to be installed in a scan post according to the invention.

FIG. 9a shows a cap 6. This cap 6 comprises a first recess 61 to match the protrusion of the scan post core and a second recess 62 which is located at the same angular position than the first recess 61.

The scan cap can be installed onto at least part of the core's pillar and within at least part of the housing of the scan post body, engaging at least part of the protrusion of the pillar as seen in FIG. 9b. Since the scan mark of the scan cap and the one of the scan post core have a stable relationship to each other when the scan post system is assembled. The goal of this scan cap is to "transfer" the scan mark of the core on a more coronal position that is easier to be identified and marked by the intra-oral scanner during the scanning process. Therefore, it is understood that the protrusion of the pillar per se does not need to be a scan mark for the scan mark of the cap to maintain its functionality as a scan mark providing the information of the core and thus of the implant 3D position and orientation.

In some particular embodiments the scan marks present on the core, and, or the body and/or the cap are all identified and processed through suitable CAD-CAM software so that the final configuration, of the generated by the practitioner scan post after final assembly of all components, is achieved.

Figure 10:
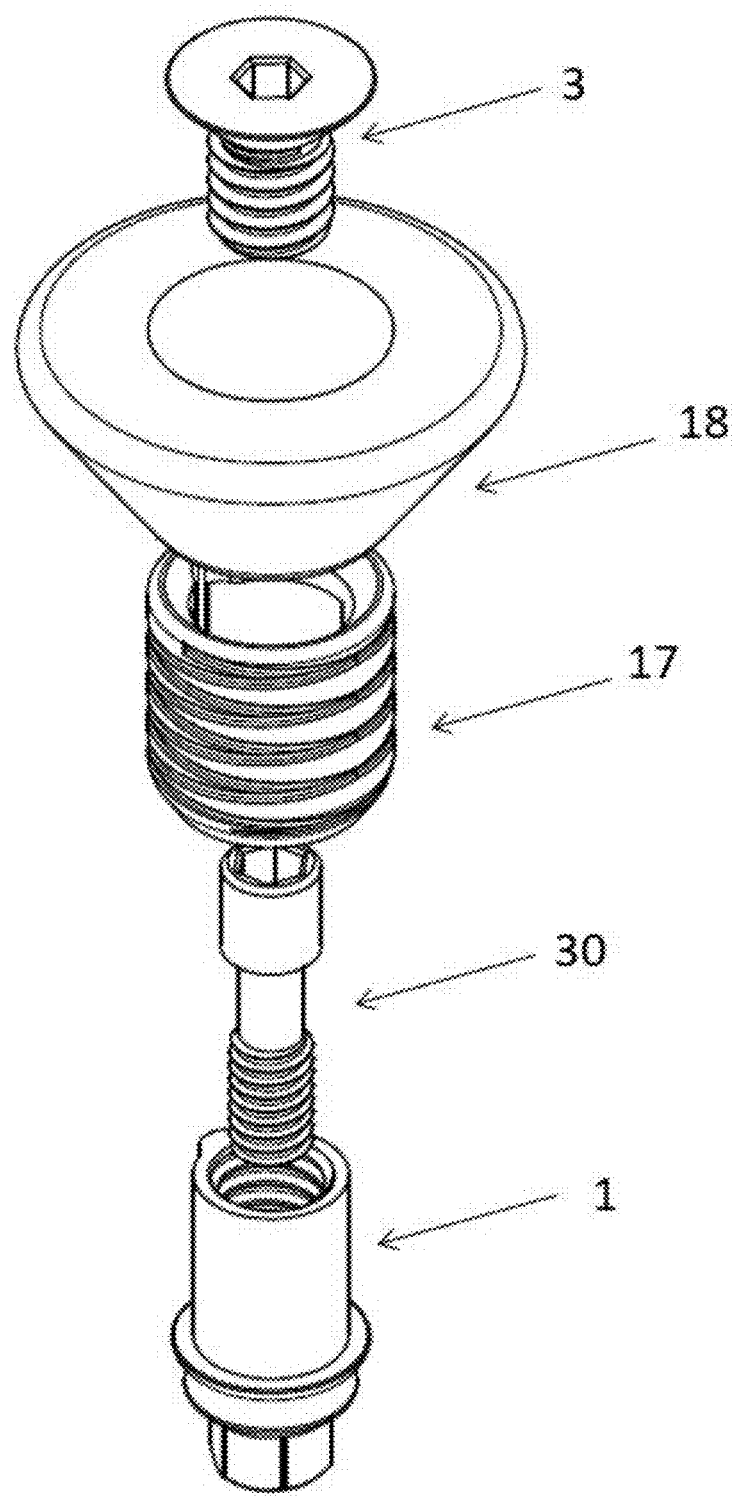
FIG. 10 shows a perspective view of a particular embodiment of a scan post according to the invention, where the scan post body is divided into two parts.
Figure 11:
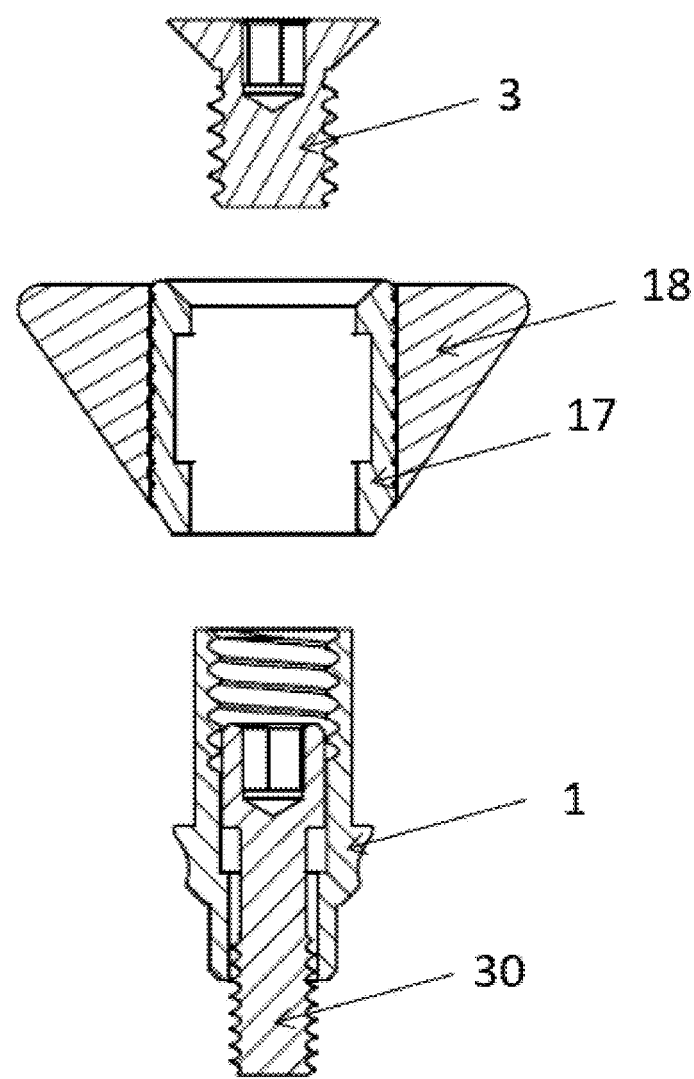
FIG. 11 shows a cross section of a particular embodiment of a scan post according to the invention, where the scan post body is divided into two parts.

FIGS. 10 and 11 show a particular example of a scan post body belonging to a scan post according to an embodiment of the invention.

In this case, the scan post body comprises two different parts 17, 18 which are manufactured separately and then attached to each other by means of an adhesive.

FIG. 10 shows an exploded view of a scan post where the scan post body comprises these two parts 17, 18. The first part 17 reproduces the internal geometry of the scan post body. In this first part 17, the relevant geometry is the internal one, which in this case reproduces the internal shape of the scan post of FIG. 6.

The external geometry of this first part 17 is designed to match with the internal geometry of the second part.

The second part 18 reproduces the external geometry of the scan post body and is coupled to the first part to form a scan post according to the invention.

These two parts may be produced by milling and then may be coupled and attached by means of an adhesive. Alternatively, these parts may be produced by injection molding where the first part is installed onto the scan post core present in a suitable well of a mould that comprises wells with anatomical shape and a suitable material is injected within the well so that it covers at least part of the first part without reaching the scan post core. Once the material is set, it will form an anatomical external shape that has become one piece with the first part or a second piece that provides for the second part with anatomical shape that will then be attached to the first part.

The main advantage of splitting the manufacturing of the scan post body into these two pieces is that they can be used in an in-office tool, so that the anatomical shapes can be formed through injection moulding process by the dentist. The internal connection is therefore uncoupled from the manufacturing process of the anatomical external shape.

In an example of a manufacturing method, the dentist first installs the scan post core inside a mould. Then, the cap is installed on the pillar of the scan post core. Next step comprises introducing flowable composite material, to be cured by light. Thus, the cap and the composite become one piece with the desired shape. After this process, the scan post core and the customised cap may be used.

The abutment core is not affected by this process and the inner surface of the inventive cap that interacts with the core is not affected by the process either. Hence, the inventive scan post's function is not affected with its methodology of use.

Thus, the proposed embodiment allows a dentist to have a customisation mould to create different shapes and sizes of anatomical bodies without the need of different cores and caps available in their office.

FIG. 11 shows a cross section of these elements when they have been partially assembled. The first and second portions 17, 18 have been attached to form the scan post body, which is to be inserted in the scan post core 1.

Figure 12:
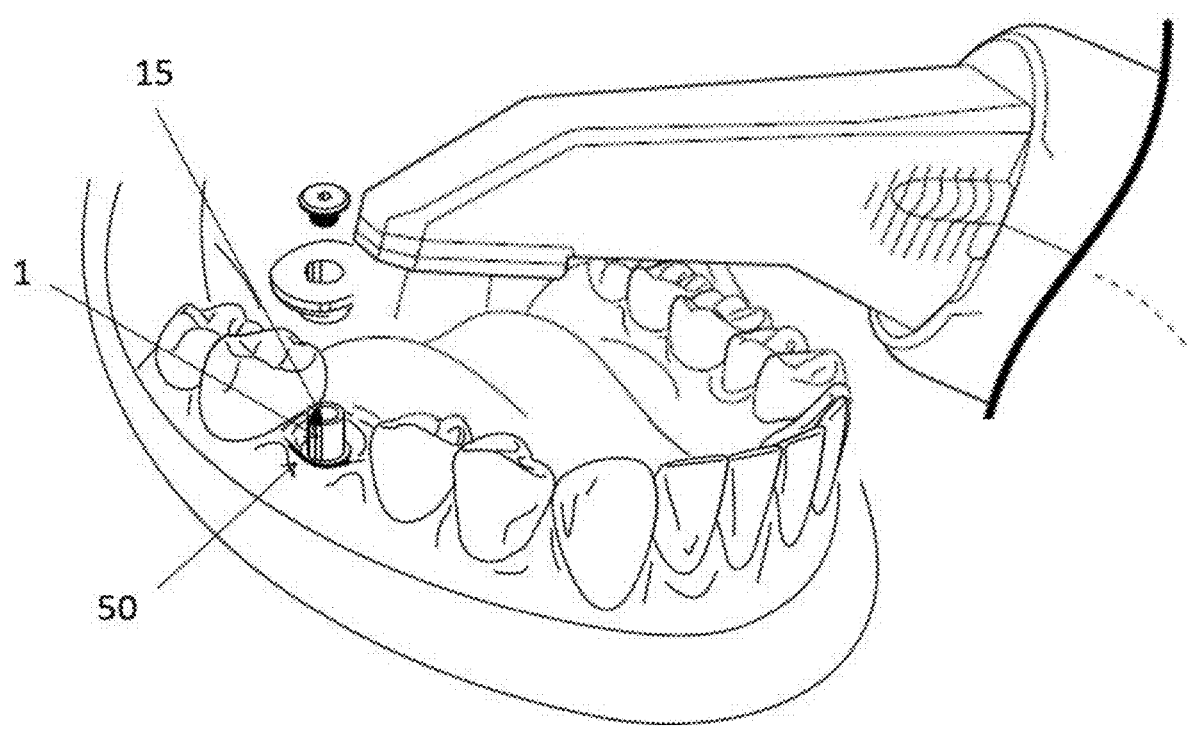
FIG. 12 shows steps of a method according to the invention.
Figure 13:
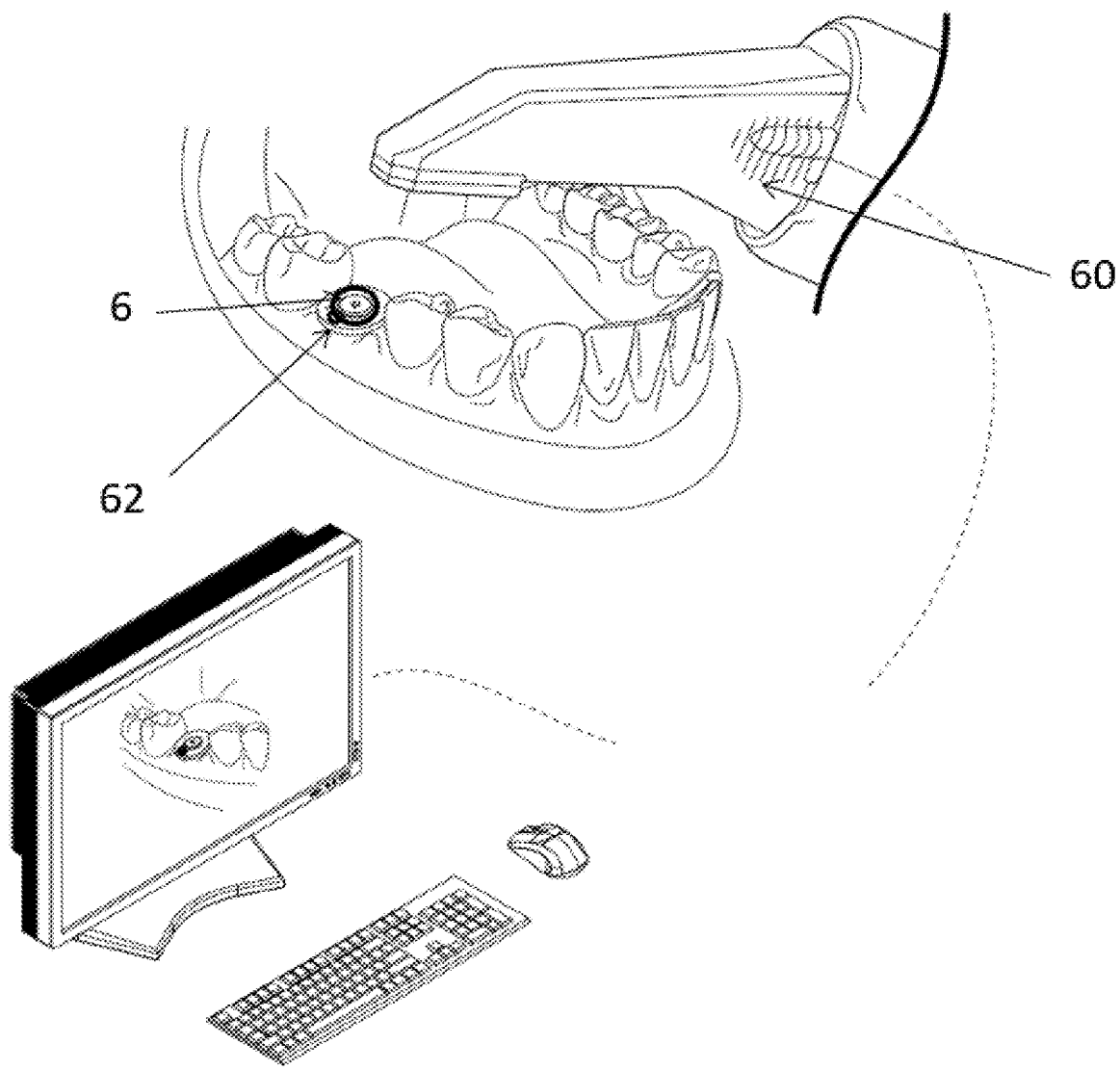
FIG. 13 shows steps of a method according to the invention.

This scan posts system may be used in a method for manufacturing dental implants prostheses as shown in FIGS. 12 and 13, the method comprising the steps of
- attaching a scan post core 1 belonging to the scan posts system 100 according to the present invention to a dental implant 50 present in an edentulous space,
- placing a scan post body 2 belonging to the scan posts system 100 around the scan post core 1;
- rotating the scan post body 2 with respect to the scan post core 1 until the scan post body 2 reaches a correct orientation;
- fixing the scan post body 2 with respect to the scan post core 1;
- letting healing tissue grow around the scan post body;
- removing the scan post body 2 from the scan post core 1;
- scanning the scan mark 4 present in the scan post core to obtain the position and orientation of the scan post and a map of the healing tissue 64 around the scan post core 1; and
- manufacture a dental implant prosthesis with the information obtained in the previous step.

The scan post is chosen from the scan post system after identifying the type and size of tooth missing and thus the best corresponding shape and size of scan body and measuring the distance between the dental implant and a cervical margin location, either directly on the patient's mouth or extra-orally.

The exact orientation of the scan post body 2 with respect to the scan post core 1 is chosen by the free rotation provided by the invention, where the practitioner may choose the orientation in a continuous range from 0 to 180°, or even more.

Then, the chosen scan post 10 is attached to a dental implant 50 which is already present in the edentulous space of a patient. This scan post 10 comprises a core with a protrusion mark 15, so that it may be scanned in a subsequent step.

During the healing process, the scan post core is installed on the implant. The implant has a prosthetic connection which is configured to receive the prosthetic connection of the core.

Once the core is assembled to the implant, the shoulder of the core sits on the platform of the implant and the prosthetic connection of the core engages to the prosthetic connection of the implant and no rotation is possible. The protrusion mark 15 provides the information with regards to the orientation of the prosthetic connection and/or the platform of the implant. This prosthetic connection can have a polygonal shape, mainly a hexagon, a triangle or an octagon. Thus, the core can be assembled onto the implant in 6, or 3, or 8 different positions, respectively. However, all of these positions lead to same clinical effect, since the scan mark of the core still provides the necessary information of the orientation of the platform and prosthetic connection, in particular of the flat seat of the prosthetic connection of the hexagonal or triangular or octagonal connection.

Once the healing tissue has been grown around the scan post, the scan post may be scanned with a scanner device 60 to obtain the position and orientation of the scan post, but also the gingival tissue profile 64 around the scan post. This map of the healing tissue is important to manufacture the final dental implant prosthesis which will be installed instead of the scan post.

FIG. 13 shows an alternative method, wherein the scan post 10 comprises a cap 6, as described in FIGS. 8a and 8b. Since this cap comprises a second recess 62 which contains the information about the orientation of the protrusion of the core, it can be scanned directly without removing of the cap or of the scan post body.

These data are sent to a CAD station where these data are received, and the final prosthesis is designed, taking into account the data obtained from the scan post and the healing tissue map also obtained by the scanner.

With these data, a suitable dental implant prosthesis will be manufactured. This prosthesis will adapt in an advantageous way to the edentulous space and to the gingival profile which has been sculpted by the scan post of the invention, and at least part of the prosthesis comprising its cervical profile and/or part of its subgingival portion will be a replicate of the inventive scan post.

Figure 14:
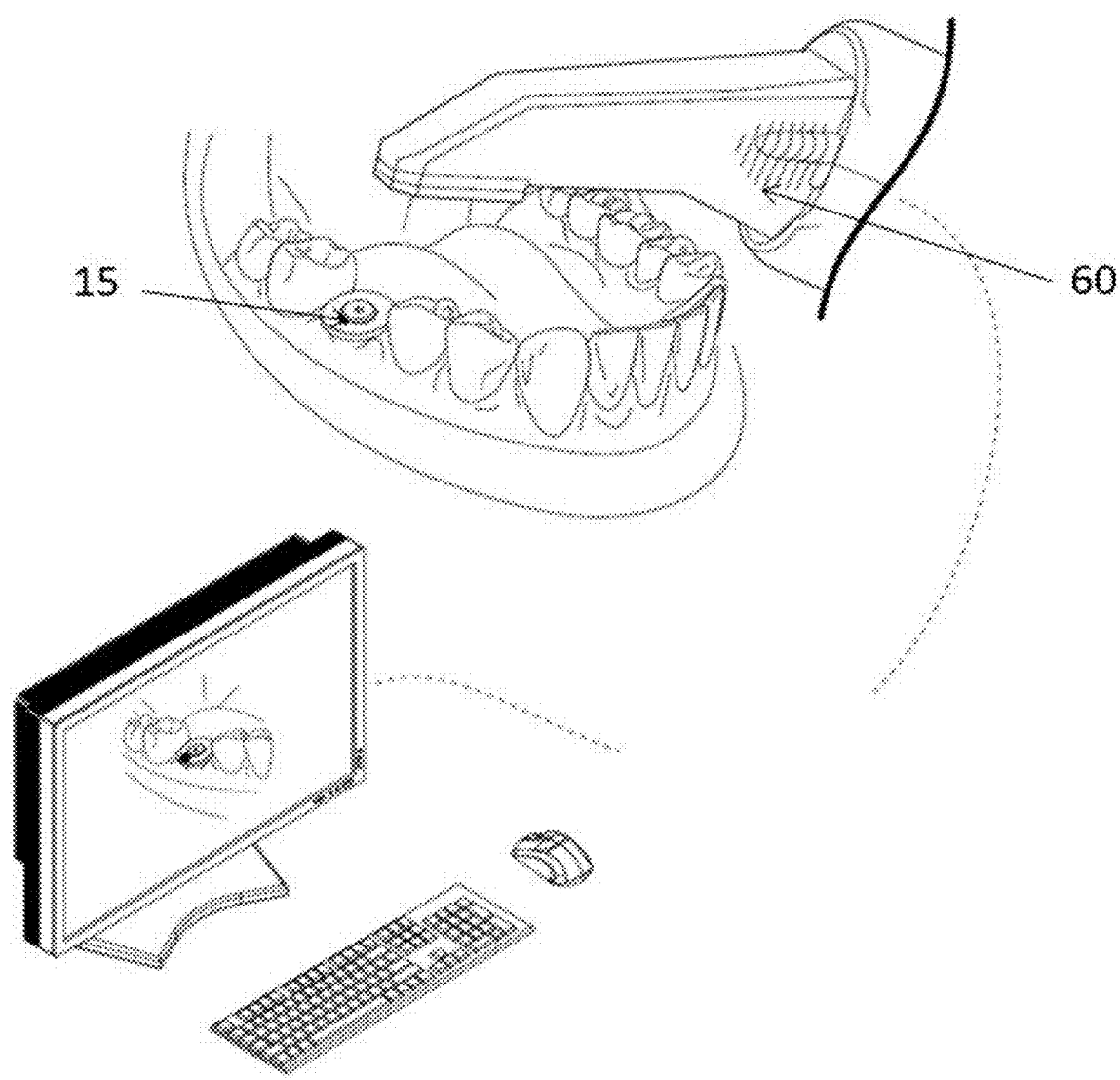
FIG. 14 shows another step of an alternative method according to the invention.

FIG. 14 shows an alternative, where the method comprises the steps of
- attaching a scan post core 1 belonging to the scan posts system according to the invention to a dental implant present in an edentulous space,
- placing a scan post body 2 belonging to the scan posts system around the scan post core 1;
- rotating the scan post body 2 with respect to the scan post core 1 until the scan post body 2 reaches a correct orientation;
- fixing the scan post body 2 with respect to the scan post core 1;
- letting healing tissue grow around the scan post body;
- scanning the scan post scan marks to obtain the position and orientation of the scan post and a map of the healing tissue around the scan post body; and
- manufacture a dental implant prosthesis with the information obtained in the previous step.

In this figure, the scanning is performed directly on the scan mark 15 which is comprised in the protrusion of the core. It is more difficult to scan it directly, since it is less accessible than in the case of the cap, but is also possible and does not require the installation of a cap.

The invention claimed is:

1. A scan post suitable for being used in designing a dental implant prosthesis, the scan post comprising:
   - a scan post core comprising: a prosthetic connection defining a connection axis, a pillar defining a pillar axis, a shoulder located between the pillar and the prosthetic connection, and a core mark;
   - a scan post body configured to be installed around the pillar of the scan post core and resting in the shoulder of the scan post core, the scan post body defining a body axis, wherein at least part of the scan post body is intended to be in contact with healing tissue;
   - a securing screw configured to securely attach the scan post body to the scan post core when a desired position of the scan post body with respect to the scan post core is achieved; and
   - an auxiliary securing screw configured to securely attach the scan post core to the dental implant,
   wherein:
   - the pillar comprises at least a portion of a cylinder having an outer diameter; and
   - the scan post body comprises a central cavity with a first portion having a cylindrical shape with a diameter configured to fit the portion of the cylinder of the pillar, so that when the scan post body is installed around the pillar, the scan post body is allowed to freely rotate around the scan post core with lateral stability.

2. The scan post according to claim 1, wherein:
   - the scan post core further comprises a protrusion protruding a protrusion length from the pillar, and the scan post body comprises a second portion extending over at least 15° of the circumference of the central cavity and being configured to allow movement of the protrusion along the second portion.

3. The scan post according to claim 2, wherein the scan post core further comprises a cap, wherein a second core mark is located in a position of the cap depending on a position of the protrusion of the scan post core.

4. The scan post according to claim 2, wherein a cross section of the scan post body perpendicular to the body axis cuts both the first portion and the second portion of the scan post body.

5. The scan post according to claim 2, wherein the central cavity of the scan post body comprises a beveled wall connecting the first portion and the second portion, preventing presence of cross sections perpendicular to the body axis which cuts both the first portion and the second portion, in view of the first portion and the second portion being separated by the beveled wall.

6. The scan post according to claim 1, wherein:
the scan post core further comprises a protrusion protruding a protrusion length from the pillar and a cap, wherein a second core mark is located in a position of the cap depending on a position of the protrusion of the scan post core;
the scan post body comprises a second portion extending over at least 15° of the circumference of the central cavity and being configured to allow movement of the protrusion along the second portion; and
the securing screw is configured to securely attach the cap to the scan post body and to the scan post core.

7. The scan post according to claim 6, wherein the securing screw comprises an opening configured to allow the protrusion of the scan post core to be visible from outside the scan post.

8. The scan post according to claim 1, wherein at least part of the scan post body and the shoulder of the scan post core form a continuous and derivable surface.

9. The scan post according to claim 8, wherein the continuous and derivable surface formed by the shoulder and at least part of the scan post body comprises a convex portion and a concave portion, the concave portion being closer to the prosthetic connection than the convex portion.

10. The scan post according to claim 1, wherein the pillar axis and the connection axis cut each other and form an angle comprised between 1 and 45°.

11. The scan post according to claim 1, wherein the pillar axis is parallel to the body axis and is arranged at a distance between 1 and 20 mm therefrom.

12. The scan post according to claim 1, wherein the scan post body further comprises second retention means and the scan post core comprises second reception means, the second retention means being arranged to abut against the second reception means to reversibly block movement of the scan post body with respect to the scan post core in a direction parallel to the pillar axis, while allowing free rotation of the scan post body with respect to the scan post core.

13. The scan post according to claim 12, wherein:
the scan post core further comprises a protrusion protruding a protrusion length from the pillar, and
the scan post body comprises a second portion extending over at least 15° of the circumference of the central cavity and being configured to allow movement of the protrusion along the second portion, and the second retention means comprises a protruding arc extended along a part of the second portion of the scan post body, and the second reception means comprises a recess performed in the protrusion of the scan post core, in such a way that the protruding arc has a height equal to the height of the recess.

14. The scan post according to claim 1, wherein the scan post body comprises two different parts attached to each other by mechanical and/or chemical retention means.

15. A scan post system suitable for being used in designing a dental implant prosthesis, the scans post system comprising a plurality of scan posts according to claim 1, wherein the system comprises at least four different scan post bodies with at least two different shapes with two different sizes and at least one height.

16. The scan post system according to claim 15, wherein the system comprises at least eighteen different scan post bodies with at least three different shapes with three different sizes and at least two heights; and wherein each scan post body comprises at least one scan mark suitable for providing information about shape, size and height of the scan post body to a scanning device, for designing a dental implant prosthesis.

17. The scan post system according to claim 15,
wherein a scan body shape of each scan post is defined by a cross section in a plane perpendicular to the pillar axis crossing the scan post at its maximum equivalent diameter,
wherein the equivalent diameter is a maximum distance between two points belonging to said cross section, and
wherein said cross section is, for each scan post, one of a triangle with rounded edges, a square with rounded edges, a parallelogram with rounded edges or an ovoid.

18. The scan post system according to claim 15, wherein a scan body height of each scan post is defined by a distance between a plane comprising a cross section of the scan post with minimum equivalent diameter and a plane comprising the cross section of the scan post with maximum equivalent diameter, wherein the equivalent diameter is the maximum distance between two points belonging to said cross section.

19. The scan post system according to claim 15, wherein a scan body size of each scan post is defined by an equivalent diameter of a cross section of the scan body in a plane perpendicular to the pillar axis crossing the scan post at its maximum equivalent diameter, wherein the equivalent diameter is a maximum distance between two points belonging to said cross section, this size being classified into at least three categories, comprising a small category, a medium category and a large category.

20. The scan post system according to claim 15, wherein at least some scan post bodies have different shapes at different cross sections perpendicular to the pillar axis, and wherein the scan marks of the at least four different scan post bodies comprise information about the different shapes and a distance of perpendicular planes from a top of the scan post body.

21. The scan post system according to claim 15,
wherein at least some scan post bodies have a circular cross section in a plane perpendicular to the pillar axis crossing the scan post body at its minimum equivalent diameter, wherein the equivalent diameter is a maximum distance between two points belonging to said cross section; and
wherein the scan mark is configured to provide information about size and height of the circular cross section.

22. A scan post suitable for being used in designing a dental implant prosthesis, the scan post comprising:
a scan post core comprising: a prosthetic connection defining a connection axis, a pillar defining a pillar axis, a shoulder located between the pillar and the prosthetic connection, and a core mark;

a scan post body configured to be installed around the pillar of the scan post core and resting in the shoulder of the scan post core, the scan post body defining a body axis, wherein at least part of the scan post body is intended to be in contact with healing tissue; and a securing screw configured to securely attach the scan post body to the scan post core and to the dental implant when a desired position of the scan post body with respect to the scan post core is achieved, wherein:
the pillar comprises at least a portion of a cylinder having an outer diameter; and the scan post body comprises a central cavity with a first portion having a cylindrical shape with a diameter configured to fit the portion of the cylinder of the pillar, so that when the scan post body is installed around the pillar, the scan post body is allowed to freely rotate around the scan post core with lateral stability.

23. A scan post suitable for being used in designing a dental implant prosthesis, the scan post comprising:

a scan post core comprising: a prosthetic connection defining a connection axis, a pillar defining a pillar axis, a shoulder located between the pillar and the prosthetic connection, and a core mark; and a scan post body configured to be installed around the pillar of the scan post core and resting in the shoulder of the scan post core, the scan post body defining a body axis, wherein at least part of the scan post body is intended to be in contact with healing tissue, wherein:
the pillar comprises at least a portion of a cylinder having an outer diameter;

the scan post body comprises a central cavity with a first portion having a cylindrical shape with a diameter configured to fit the portion of the cylinder of the pillar, so that when the scan post body is installed around the pillar, the scan post body is allowed to freely rotate around the scan post core with lateral stability; and the scan post further comprises glue or a friction fit connection configured to securely attach the scan post body to the scan post core when a desired position of the scan post body with respect to the scan post core is achieved.

\* \* \* \* \*